(12) United States Patent
Mizohata

(10) Patent No.: US 7,914,068 B2
(45) Date of Patent: Mar. 29, 2011

(54) VEHICLE BODY SIDE STRUCTURE

(75) Inventor: Hitoshi Mizohata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/757,531

(22) Filed: Apr. 9, 2010

(65) Prior Publication Data
US 2010/0259072 A1 Oct. 14, 2010

(30) Foreign Application Priority Data

Apr. 10, 2009 (JP) ................................. 2009-095448

(51) Int. Cl.
*B60J 7/00* (2006.01)
(52) U.S. Cl. .......... 296/193.06; 296/187.12; 296/193.05
(58) Field of Classification Search ............. 296/193.06, 296/187.12, 193.05
See application file for complete search history.

(56) References Cited

U.S. PATENT DOCUMENTS
7,396,072 B2 * 7/2008 Fischer et al. ........... 296/203.03
2006/0097549 A1 5/2006 Fischer et al.

FOREIGN PATENT DOCUMENTS
DE 19946013 3/2001
DE 10160885 7/2003
JP 8-243770 9/1996

* cited by examiner

*Primary Examiner* — Joseph D Pape
(74) *Attorney, Agent, or Firm* — Rankin, Hill & Clark LLP

(57) ABSTRACT

In a vehicle body side structure, a tailor welded blank is used for forming an outer panel assembly consisting of a frame structure, and a center pillar assembly is connected vertically between a roof side rail and a side sill outer of the outer panel assembly. The center pillar assembly is made of a material having a higher mechanical strength than most of the outer panel assembly. Thereby, the stamp forming process can be simplified, and a required mechanical strength can be ensured in a favorable manner. In particular, the center pillar assembly may include a center pillar outer made of material having a higher mechanical strength than at least a part of the outer panel assembly, the center pillar outer being attached to an outboard side of the side sill outer at a lower end thereof and to an inboard side of the roof side rail at an upper end thereof.

14 Claims, 4 Drawing Sheets

VEHICLE BODY SIDE STRUCTURE

TECHNICAL FIELD

The present invention relates to a side structure of a vehicle body, and in particular to a side structure of a vehicle body using tailor welded blanks

BACKGROUND OF THE INVENTION

A tailor welded blank (TWB) combines a plurality of different metallic materials into a welded blank so that the best properties of the materials are located precisely where they are needed. The introduction of the TWB owes to the development in computerized structural analysis. As this new blank material is highly beneficial in reducing the weight of the structure while ensuring the required mechanical strength, the use of this material for automotive bodies has advanced significantly over the past years with the aim of reducing weight and improving the fuel economy.

Typically, a TWB is prepared by welding a plurality of individual blank pieces having different thicknesses and/or mechanical properties into a single blank, and the single blank or the TWB is stamp formed into a prescribed shape. See Japanese patent laid open publication No. 8-243770 (patent document 1), for instance.

The technology disclosed in patent document 1 is directed to the use a TWB to an outer panel of a vehicle body side structure. In particular, a plurality blank pieces are laser welded into a single C-shaped blank, and an additional blank piece forming a center pillar is spot welded to the C-shaped blank so as to form a frame structure defining a door opening. Therefore, provided that the spot welded portions are avoided from being significantly drawn during the subsequent stamp forming process, the frame structure can be formed as a single blank without requiring any significant precision during the welding of the individual blank pieces. This prior art has the advantage of simplifying the welding process in preparing a TWB, but imposes some restriction in the stamp forming process.

As a vehicle body side structure requires a particularly high mechanical strength in selected parts thereof, there is a high gain in applying the TWB approach to a vehicle body side structure. However, there are some problems that need to be overcome when applying the TWB approach to a vehicle body side structure. As a vehicle body side structure requires a relatively large blank, a corresponding large forming pressure is required in the stamp forming process. It is also desired that the welding process required for forming a TWB does not require any undue welding precision.

BRIEF SUMMARY OF THE INVENTION

In view of such problems of the prior art, a primary object of the present invention is to provide a vehicle body side structure that is based on the TWB approach but can be stamp formed without any unduly large forming pressure.

A second object of the present invention is to provide a vehicle body side structure that is based on the TWB approach but can be fabricated without any undue difficulty.

According to the present invention, such objects can be accomplished by providing a vehicle body side structure, comprising: an outer panel assembly formed by stamp forming a blank combining a plurality of individual blank pieces having different mechanical properties by welding, the outer panel assembly defining a frame structure including an upper member and a lower member; and a center pillar assembly having an upper end connected to the upper member and a lower end connected to the lower member so as to define a pair of door openings jointly with the outer panel assembly; wherein the center pillar assembly includes a center pillar outer made of material having a higher mechanical strength than at least a part of the outer panel assembly, the center pillar outer being attached to an outboard side of the lower member at a lower end thereof and to an inboard side of the upper member at an upper end thereof.

Because the outer panel assembly forming a frame structure is formed by combining a plurality of blank pieces having different mechanical properties by welding, and stamp forming the resulting blank, and the center pillar outer having a high mechanical strength is then attached to the frame structure, the two parts can be stamp formed individually so that the stamp forming process does not require any undue forming pressure and/or does not involve any undue difficulty in performing the stamp forming process. Furthermore, the outer panel assembly is not required to have any complex shape, and may include a part which does not require a high rigidity, and this also contributes to the reduction in the required forming pressure in the stamp forming process and the simplification of the stamp forming process.

The mechanical properties mentioned above typically includes mechanical strength and rigidity, and may be varied by selecting different materials and/or selecting different thicknesses for different blank pieces. Also, the welding method for forming the outer panel assembly may consist of laser welding, spot welding, MIG welding, TIG welding or a combination thereof.

As the center pillar outer is attached to an outboard side of the lower member at a lower end thereof and to an inboard side of the upper member at an upper end thereof the assembling of the center pillar can be effected in a highly simple and efficient manner. In particular, if an upper end of the center pillar outer is directly joined to the corresponding lateral end of a roof arch that extends laterally across a roof of the vehicle body, the crash performance of the vehicle body can be ensured by using a minimum amount of material.

Typically, the outer panel assembly comprises a tailor welded blank including a first blank piece having a relatively low mechanical strength and a second blank piece having a relatively high mechanical strength that are welded together, the tailor welded blank being stamp formed into a prescribed shape, and the center pillar outer is stamp formed into a prescribed shape before being attached to the outer panel assembly.

According to a preferred embodiment of the present invention, the upper member of the outer panel assembly comprises a roof side rail, and the lower member of the outer panel assembly comprises a side sill outer, the upper end of the center pillar outer being welded to an inboard face of the roof side rail, and the lower end of the center pillar being welded to an outboard face of the side sill outer.

As the side sill is highly important in ensuring the crash performance of the vehicle body, the side sill outer may be made of a material having a higher strength than the roof side rail.

According to a particularly preferred embodiment of the present invention, the outer panel assembly further comprises a front pillar upper connected to a front end of the roof side rail, a front pillar lower connected between a lower end of the front pillar upper and a front end of the side sill outer, and a rear pillar/panel member connected between a rear end of the roof side rail and a rear end of the side sill outer.

As the side sill is highly important in ensuring the crash performance of the vehicle body, the side sill outer may be made of a material having a higher strength than the roof side rail or the rear pillar/panel member. Likewise, as the front pillar lower is important in ensuring the crash performance of the vehicle body, the front pillar lower may be made of a material having a higher strength than the roof side rail or the rear pillar/panel member. The rear pillar/panel member may be made of a material having a substantially same mechanical strength as the roof side rail so that the preparation of the TWB may be simplified.

Even when the lower end of the center pillar outer is welded to the outboard side of the side sill, the welding joint can be conveniently concealed from view by using a side garnish.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
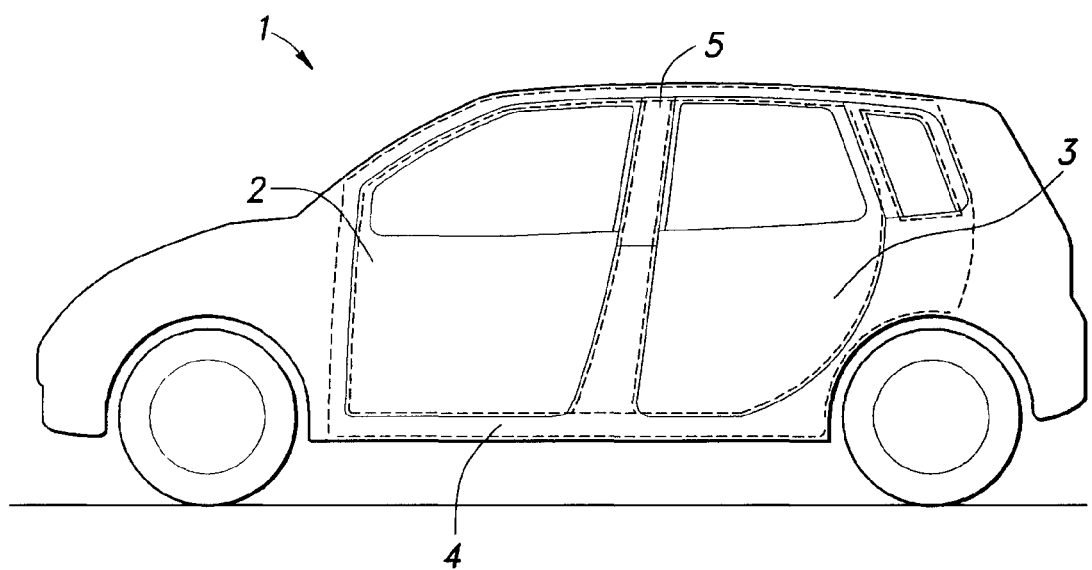
FIG. 1 is a simplified side view of a hatchback vehicle using a vehicle body side structure embodying the present invention.

FIG. 1 shows a five door hatchback automobile embodying the present invention which comprises a pair of front doors 2, a pair of rear doors 3 and a tailgate not shown in the drawings. The vehicle body 1 includes an outer panel assembly 4 forming a frame structure on each side thereof defining an opening encompassing the front door 2 and rear door 3 as indicated by the broken lines, and a center pillar assembly 5 extending vertically across the opening so as to define individual openings for the front door 2 and rear door 3, respectively. The upper and lower ends of the center pillar assembly 5 are joined to the opposing upper and lower parts of the outer panel assembly 4.

The outer panel assembly 4 is required to have an adequate mechanical strength and rigidity so as to maintain the integrity of the cabin under all conceivable conditions. The center pillar assembly 5 (in particular, a center pillar outer thereof as will be discussed hereinafter) may be made of a super high tensile steel based on this consideration also. The overall structure is based on the TWB concept.

Figure 2:
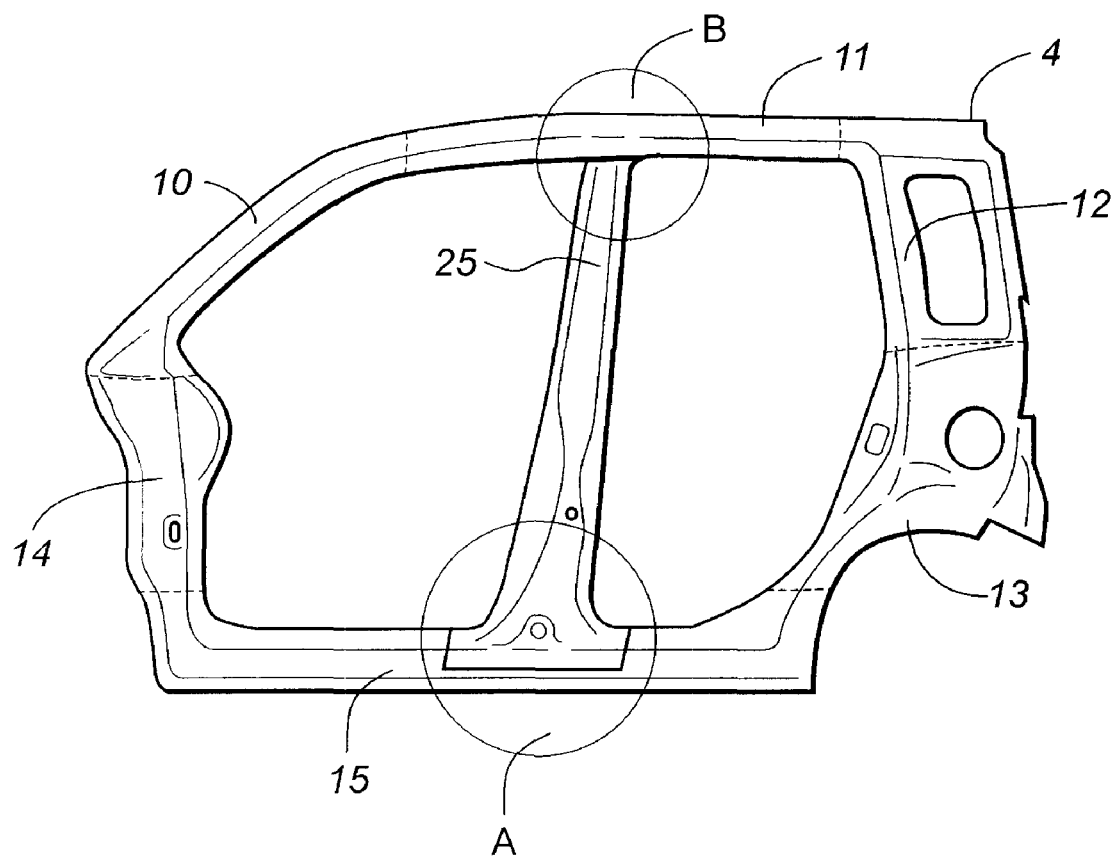
FIG. 2 is a side view of an outer panel assembly and a center pillar assembly of the vehicle body side structure.

Referring to FIG. 2, the outer panel assembly 4 includes a front pillar upper 10 forming a front upper part thereof, a roof side rail 11 forming an upper part thereof, a rear pillar 12 forming an upper rear part thereof, a rear panel 13 forming a lower rear part thereof, a front pillar lower 14 forming a lower front part thereof and a side sill outer 15a forming a lower part thereof so as to jointly form a frame structure. A side sill inner 15b is attached to the side sill outer 15a so as to jointly define a side sill 15 having a closed cross section. The upper end of the center pillar assembly 5 is joined to the roof side rail 11, and the lower end of the center pillar assembly 5 is joined to the side sill 15. The front pillar upper 10, roof side rail 11, rear pillar 12, rear panel 13, front pillar lower 14 and side sill outer 15a are formed by individual blank pieces, and are welded to one another by laser welding, for instance. Such weld lines are indicated by broken lines in FIG. 2. The laser welding is typically performed as butt welding as disclosed in patent document 1, and has the advantages of minimized thermal stress effect, limited welding area and minimized stress concentration. However, other welding methods such as spot welding, MIG welding and TIG welding, instead of laser welding, may be used either wholly or partly without departing from the spirit of the present invention. After the individual blank pieces are welded together into a frame structure, the assembly (a combined blank or a tailor welded blank) is stamp formed into the final shape of the outer panel assembly 4.

The center pillar assembly 5 essentially consists of a center pillar outer 25 and a center pillar inner 26. The center pillar outer 25 is stamp formed into a prescribed shape, and is then welded to the outer panel assembly 4. The mode of assembling the center pillar outer 25 to the outer panel assembly 4 is described hereinafter in greater detail.

The center pillar outer 25 is made of high strength material such as super high tensile steel having a tensile strength of 1,500 MPa and a thickness of 1.2 mm, and has a significantly higher mechanical strength than at least most part of the blank pieces of the outer panel assembly 4. The front pillar upper 10, roof side rail 11, rear pillar 12 and rear panel 13 are made of a relatively low mechanical strength material such as soft steel having a tensile strength of 270 MPa and a thickness of 0.65 mm, and the front pillar lower 14 is made of a material, having a mechanical strength between the center pillar outer 25 and the remaining part of the outer panel assembly 4, such as high tensile steel having a tensile strength of 980 MPa and a thickness of 1.6 mm. The side sill outer 15a is likewise made of material having an intermediate mechanical strength between the center pillar outer 25 and the remaining part of the outer panel assembly 4, such as high tensile steel having a tensile strength of 980 MPa and a thickness of 1.2 mm. The side sill inner 15b may be made of a similar material as the side sill outer 15a or a material having a lower mechanical strength.

By thus using a relatively high strength material for the lower part of the outer panel assembly 4 and an even higher strength material for the center pillar outer 25, the center pillar supporting the door hinges and side sill effective in withstanding crash stress are reinforced, and this is highly effective in avoiding deformation of the cabin. As can be seen from FIGS. 1 and 2, the weld lines between the blank pieces are conveniently concealed by the front door 2, rear door 3 and a side sill garnish 28 (FIG. 3b) covering the side sill 15, and thereby do not impair the external appearance of the vehicle body 2.

The process of welding the center pillar outer 25 to the outer panel assembly 4 is described in the following with reference to FIGS. 3a, 3b, 4a and 4b.

Figure 3A:
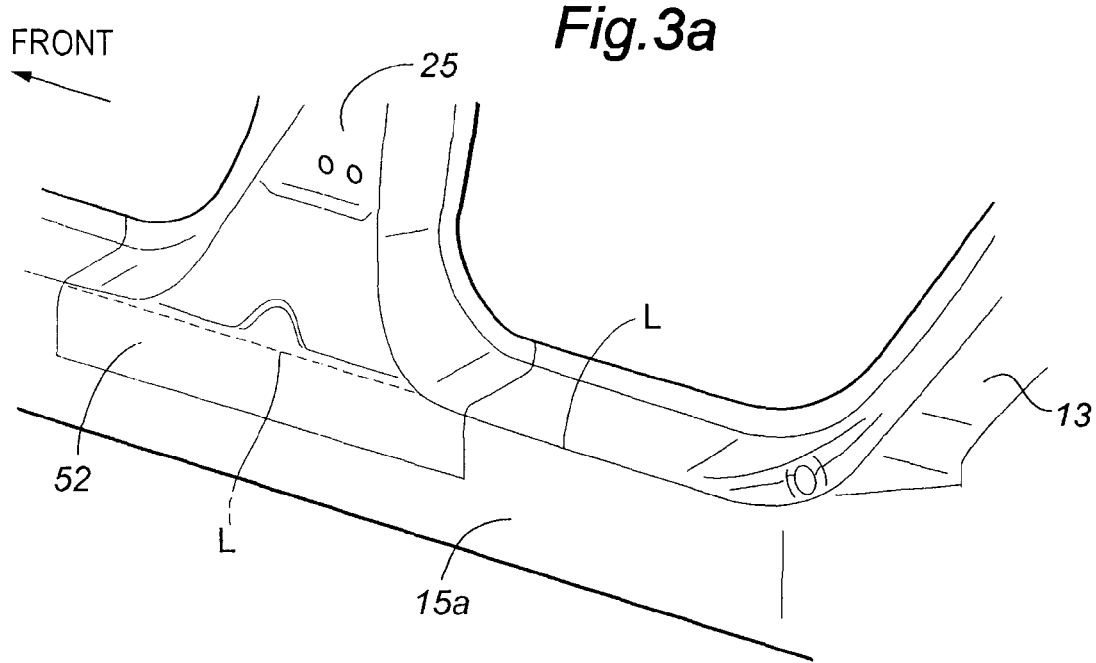
FIG. 3a is an enlarged fragmentary perspective view of a part of FIG. 1 indicated by A an FIG. 2 showing a joint between a lower part of the center pillar assembly and a side sill outer of the outer panel assembly.
Figure 3B:
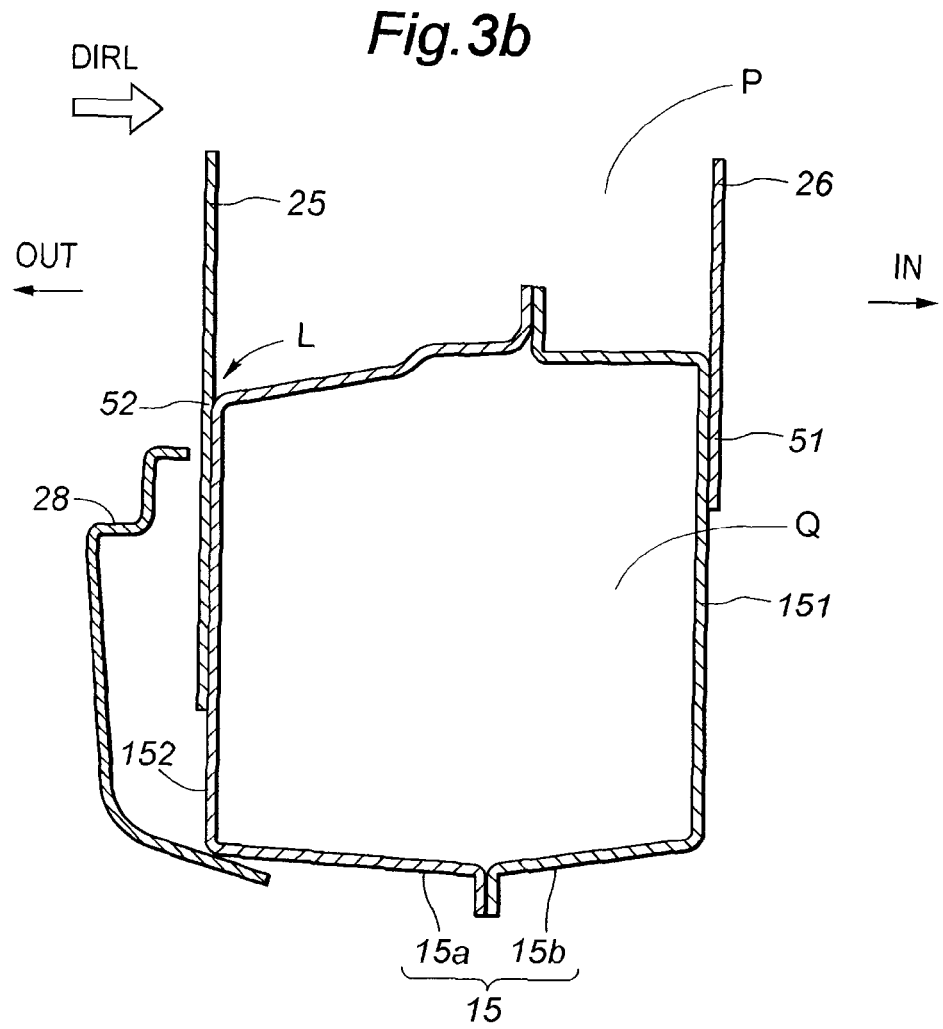
FIG. 3b is a cross sectional view of the joint between the lower part of the center pillar and the side sill of the outer panel assembly.

FIG. 3a is a fragmentary perspective view showing the details of the part indicated by A in FIG. 2, and FIG. 3b is a vertical sectional view of the lower part of the center pillar outer 25 joined to the side sill outer 15a. Referring to FIGS. 3a and 3b, the center pillar outer 25 is attached to a vertically extending outboard side face 152 of the side sill outer 15a of the outer panel assembly 4 with a prescribed overlap as denoted with numeral 52, and the center pillar inner 26 is attached to a vertically extending inboard side face 151 of the side sill inner 15b attached to the inboard side of the side sill outer I 5a with a slightly smaller overlap as denoted with numeral 51. Thereby, a closed cross section Q is defined by the side sill outer 15a and side sill inner 15b, and another closed cross section P is defined by the center pillar outer 25, side sill 15 and center pillar inner 26.

As shown in FIG. 3b, when attaching the center pillar outer 25 to the outer panel assembly 4, the center pillar outer 25 is applied to the outer panel assembly 4 from outside the vehicle body or in the direction indicated by white arrow DIRL so that the overlapping portion 52 of the inboard face of the center pillar outer 25 rests against the outboard side face 152 of the side sill 15. The lower part of the center pillar outer 25 is given with an enlarged width. Therefore, the lower part of the center pillar outer 25 extends along an upper ridge line L of the side sill 15 over the entire width of the center pillar outer 25, and this contributes to an increase in the crash performance of the vehicle body with respect to frontal, rear and side crashes.

Figure 4A:
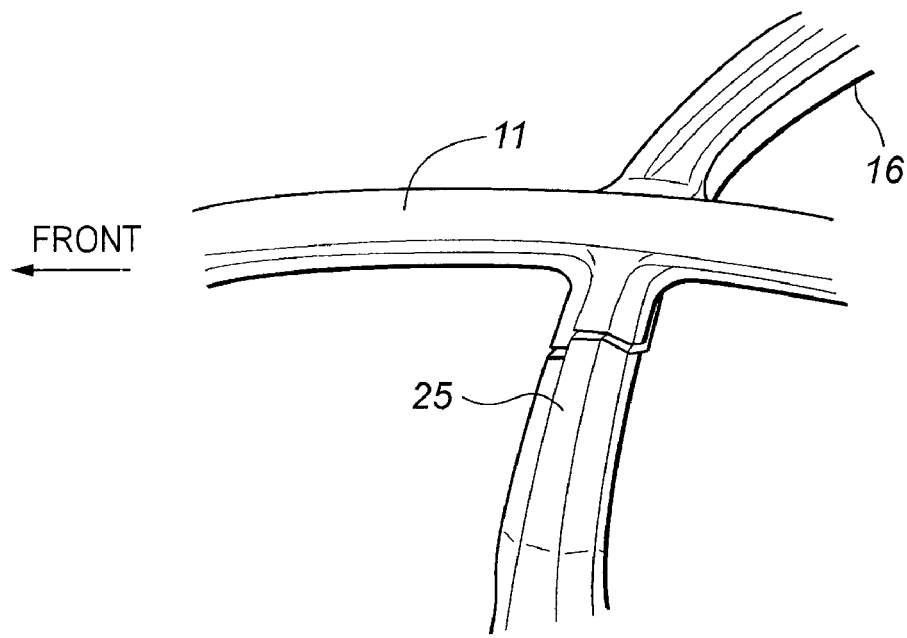
FIG. 4a is an enlarged fragmentary perspective view of a part of FIG. 1 indicated by B in FIG. 2 showing a joint between an upper part of the center pillar assembly and a roof side rail of the outer panel assembly.
Figure 4B:
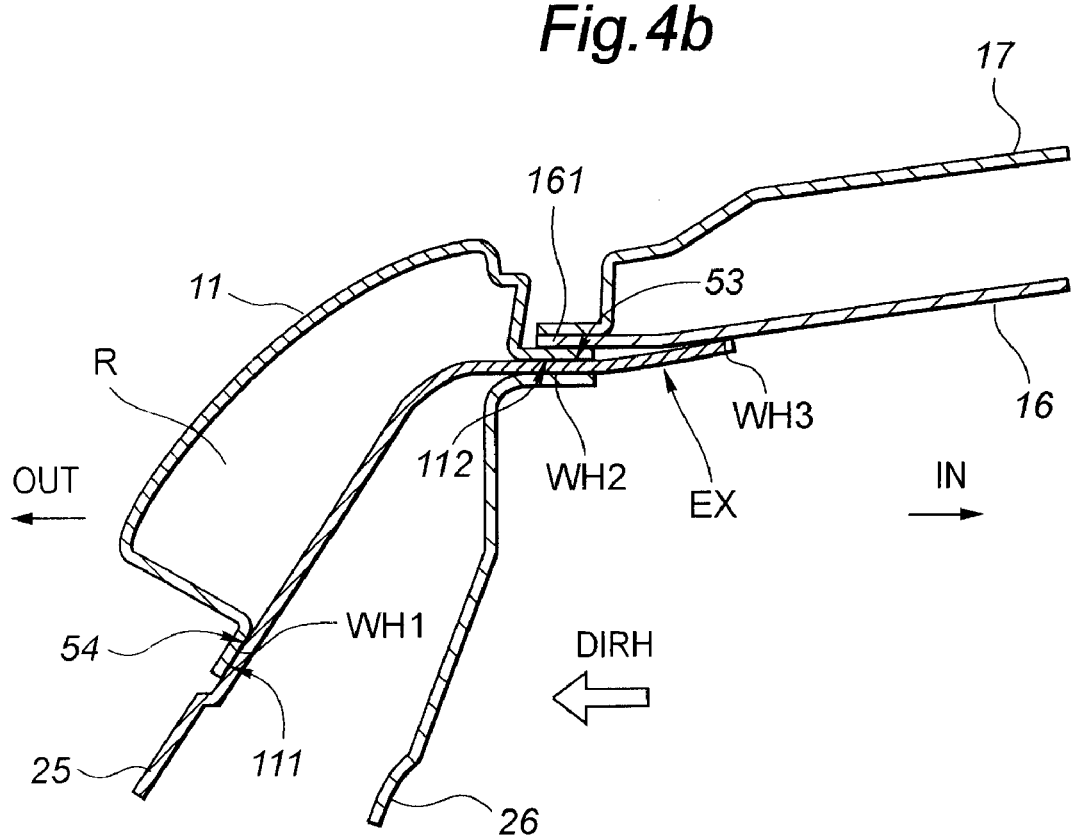
FIG. 4b is a cross sectional view of the joint between the upper part of the center pillar assembly and the roof side rail of the outer panel assembly.

FIG. 4a is an enlarged fragmentary perspective view of the part indicated by B in FIG. 2, and FIG. 4b is cross sectional view of an upper part of the center pillar assembly 5 joined to the roof side rail 11 of the outer panel assembly 4. A roof arch 16 extends between the two outer panel assemblies 4 laterally across the vehicle body, and supports a roof panel 17 generally defining an upper part of the vehicle body or the cabin thereof. The roof arch 16 is given with a high rigidity and mechanical strength with the aim of preventing the deformation of the cabin under all conceivable conditions. The upper end of the center pillar outer 25 is bent inboard, and extends substantially horizontally as denoted by letters EX.

When assembling the center pillar outer 25, an upper surface 54 of an upper part of the center pillar outer 25 is applied to the inboard face 111 of the lower flange of the roof side rail 11, and is spot welded thereto. The free edge EX of the upper end of the center pillar outer 25 is then directly spot welded to the opposing (lower) surface of the lateral end of the roof arch 16 as indicated by WH3 in FIG. 4b. Thereafter, the upper end of the center pillar outer 25 is applied to an inboard side of the roof side rail 11 of the outer panel assembly 4 from inside the vehicle body or in the direction indicated by white arrow DIRH until an upper end surface 53 of the center pillar outer 25 abuts a lower surface 112 of an upper flange of the roof side rail 11 of the outer panel assembly 4. Thus, the roof side rail 11 and center pillar outer 25 jointly define a closed cross section R.

Additionally, the upper flange of the roof side rail 11 overlaps with the side edges of the roof panel 17, a lateral end 161 of the roof arch 16, the horizontal part of the upper end of the center pillar outer 25 and the horizontal upper end of the center pillar inner 26 (which is bent inboard and extends horizontally) at this time, and the roof side rail 11, roof panel 17, roof arch 16, center pillar outer 25 and center pillar inner 26 are jointly spot welded in the area denoted with WH2 which is slightly offset from the free edge WH3 of the upper end of the center pillar outer 25 in the outboard direction.

In the foregoing welding process, other welding methods such as laser welding and MIG welding may also be used. By thus directly connecting the center pillar outer 25 to the roof arch 16, a direct path of force transmission is formed between the two members given with a high mechanical strength and rigidity so that a required mechanical strength and rigidity of the cabin against side crashes can be achieved without relying on various reinforcement pieces and brackets.

In the foregoing embodiment, the outer panel assembly was formed as a TWB combining a plurality of individual blank pieces, and stamp formed into the required shape. Thereafter, the center pillar outer already stamp formed into the prescribed shape was welded to the outer panel assembly, and the center pillar inner was then welded to the center pillar outer and side sill. Therefore, the stamp forming process can be accomplished without requiring any undue forming pressure. The center pillar outer may be stamp formed separately from the outer panel assembly, and can be made of a high mechanical strength material as compared at least with a part of the outer panel assembly. The center pillar outer can be joined to the outer panel by spot welding or other welding process. In particular, by joining the center pillar outer with the roof arch without intervention of thin shell or otherwise low-strength or low-rigidity member, the side crash performance of the vehicle body can be ensured with the use of a minimum amount of material. Also, as the outer panel assembly is made of a TWB, an adequate mechanical strength can be ensured without relying heavily on additional reinforcement members and stiffeners, and this contributes to a light weight design of the vehicle body.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of any prior art documents mentioned in this application are incorporated in this application by reference.

The invention claimed is:

1. A vehicle body side structure, comprising:
an outer panel assembly formed by stamp forming a blank combining a plurality of individual blank pieces having different mechanical properties by welding, the outer panel assembly defining a frame structure including an upper member and a lower member; and
a center pillar assembly having an upper end connected to the upper member and a lower end connected to the lower member so as to define a pair of door openings jointly with the outer panel assembly;
wherein the center pillar assembly includes a center pillar outer made of material having a higher mechanical strength than at least a part of the outer panel assembly, the center pillar outer having a lower end and an upper end, said center pillar outer lower end being attached to an outboard side of the lower member and said center pillar upper being attached to an inboard side of the upper member.

2. The vehicle body side structure according to claim 1, wherein the outer panel assembly comprises a tailor welded blank including a first blank piece and a second blank piece that are welded together, said first blank piece having a relatively low mechanical strength and said second blank piece having a relatively high mechanical strength, the tailor welded blank being stamp formed into a prescribed shape.

3. The vehicle body side structure according to claim 1, wherein the center pillar outer is stamp formed into a prescribed shape before being attached to the outer panel assembly.

4. The vehicle body side structure according to claim 1, wherein the upper member of the outer panel assembly comprises a roof side rail, and the lower member of the outer panel assembly comprises a side sill outer, the upper end of the center pillar outer being welded to an inboard face of the roof side rail, and the lower end of the center pillar being welded to an outboard face of the side sill outer.

5. The vehicle body side structure according to claim 4, wherein the side sill outer is made of a material having a higher strength than that of the roof side rail.

6. The vehicle body side structure according to claim 4, wherein the outer panel assembly further comprises a front pillar upper connected to a front end of the roof side rail, a front pillar lower connected between a lower end of the front pillar upper and a front end of the side sill outer, and a rear pillar/panel member connected between a rear end of the roof side rail and a rear end of the side sill outer.

7. The vehicle body side structure according to claim 5, wherein the side sill outer is made of a material having a higher strength than that of the roof side rail.

8. The vehicle body side structure according to claim 5, wherein the side sill outer is made of a material having a higher strength than that of the rear pillar/panel member.

9. The vehicle body side structure according to claim 5, wherein the front pillar lower is made of a material having a higher strength than that of the roof side rail.

10. The vehicle body side structure according to claim 5, wherein the front pillar lower is made of a material having a higher strength than that of the rear pillar/panel member.

11. The vehicle body side structure according to claim 5, wherein the rear pillar/panel member is made of a material having a substantially same mechanical strength as that of the roof side rail.

12. The vehicle body side structure according to claim 5, wherein the individual blank pieces include at least two pieces that have different thicknesses.

13. The vehicle body side structure according to claim 1, further including a side garnish that covers a joint between the lower end of the center pillar outer and the side sill outer.

14. The vehicle body side structure according to claim 1, wherein an upper end of the center pillar outer is directly joined to a corresponding lateral end of a roof arch that extends laterally across a roof of the vehicle body.

* * * * *